Figure 1:
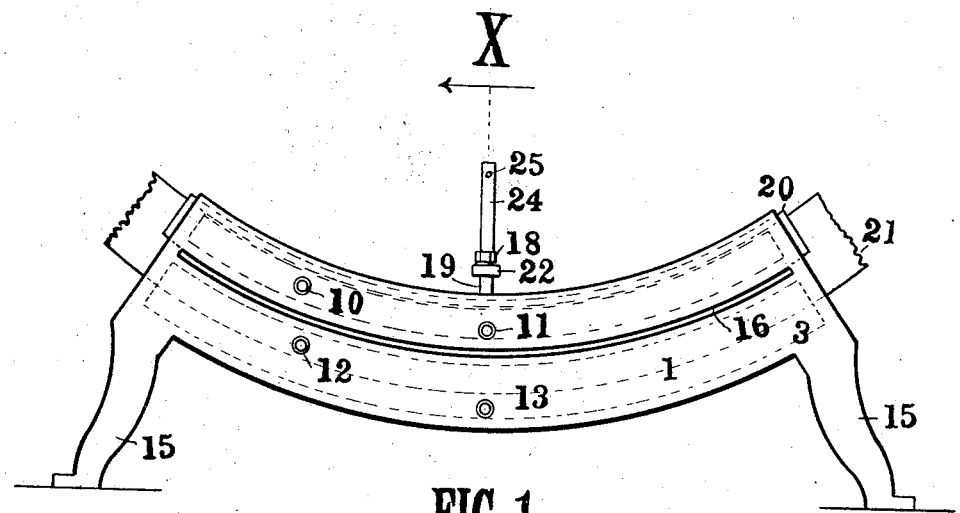

J. K. WILLIAMS.
VULCANIZER.
APPLICATION FILED APR. 1, 1908.

914,905.

Patented Mar. 9, 1909.

WITNESSES
Glenara Fox
Evelyn Blinn

INVENTOR
John K. Williams
C. E. Humphrey
BY
ATTORNEY.

UNITED STATES PATENT OFFICE.

JOHN K. WILLIAMS, OF AKRON, OHIO, ASSIGNOR OF ONE-HALF TO THE WILLIAMS FOUNDRY AND MACHINE COMPANY, OF AKRON, OHIO, A CORPORATION OF OHIO.

VULCANIZER.

No. 914,905.

Specification of Letters Patent.

Patented March 9, 1909.

Application filed April 1, 1908. Serial No. 424,654.

*To all whom it may concern:*

Be it known that I, JOHN K. WILLIAMS, a citizen of the United States, residing at Akron, in the county of Summit and State of Ohio, have invented new and useful Improvements in Vulcanizers, of which the following is a specification.

This invention relates to improvements in vulcanizers designed more especially for use in repairing vehicle-wheel tires or tire-cases. In repairing a tire by vulcanization it is important that all good portions of the tire surrounding the injured part may be as fully protected from injury from the vulcanizing heat as possible and that shoulders or ridges shall not be formed at points of junction between the patch employed in repairing the tire with the main body of the same.

The objects of this invention are to provide a strong, simple, efficient and economically operating vulcanizer in which desired portions of a tire or tire case may be placed and subjected to heat for the purpose of vulcanizing a patch on an injured portion thereof.

A further and special object of this invention is to provide a vulcanizer of the class described with means whereby the vulcanizing heat is prevented from spreading to other portions of the tire or tire case surrounding the injured portion undergoing repairs contained within the body of the vulcanizer.

A practical embodiment of this invention is illustrated in the accompanying drawings in which similar reference numerals indicate like parts in the different figures.

Figure 2:
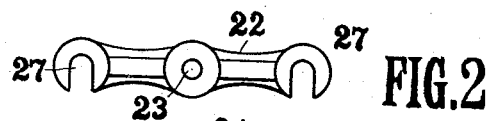

Referring to the drawings, Figure 1 is a view in side elevation of my improved vulcanizer. Fig. 2 is a plan view of a yoke employed in connection with the device shown in Fig. 1, and, Fig. 3 is a sectional view on line X of Fig. 1.

Referring to the drawings in detail, the reference numeral 1 indicates the body of the vulcanizer which is formed in the arc of a circle and comprises an inner trough-shaped curing cavity inclosed by a wall 2 and a surrounding or outer wall 3, the space between the walls 2 and 3 being preferably divided into steam cavities 4, 5 and 6 extending longitudinally of the body of the device and approximately the same length thereof. The cavities 4 and 5 are separated from the cavity 6 by means of integrally-formed partitions 7 and 8, and strengthening lugs 9 are interposed at intervals between the under face of the wall 2 and the bottom of the body portion 3. The steam chambers 4 and 5 are provided with inlets 10 for the admission of the heating agent and with outlets 11 by which the products of condensation thereof are permitted to escape. The cavity 6 is also provided with an inlet 12 and outlet 13. The body of the vulcanizer is also provided with supporting legs 15.

Figure 3:
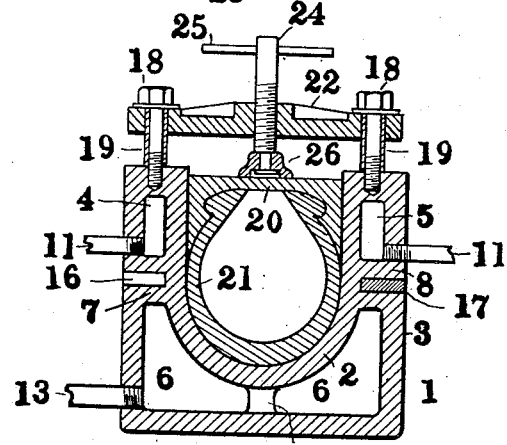

The entire body of the device 1 is preferably made integral and in view of this fact it will be apparent that when any one of the cavities 4, 5 or 6 is heated by steam the heat is absorbed by the metal surrounding the particular chamber which is being used and rapidly communicates itself to the balance of the device; and in order to prevent this as far as possible, there is formed in the body of the vulcanizer between the steam cavities 4 and 6 and 5 and 6 a longitudinally-extending groove or space 16 which may be left open for the admission of air, as shown in Fig. 3 or may be filled with an insulating material 17 as indicated in this figure; in either case the effect of the interposed groove is to prevent the heat in one of the steam chambers from being communicated to the balance of the device and from thence to the good or uninjured portions of a tire contained in the vulcanizer.

In the upper face of the vulcanizer are mounted a pair of bolts 18 surrounded by sleeves 19 against which the heads of the bolts are screwed, thereby limiting the distance between the heads of the bolts and the upper face of the vulcanizer and also constituting a wear-resisting cover for said bolts. The tire or tire case is held in the curing cavity by means of a member 20 having a curvature approximating the curvature of the body of the vulcanizer, with a flat upper face and with its under face formed to receive a tire or tire case, as shown in Fig. 3 and of a width sufficient to enter the curing cavity of the vulcanizer body. Before the tire, designated in the drawings by the reference numeral 21, is placed in the vulcanizer cavity, the member 20 is preferably secured in position thereon and the two are slipped into position in the cavity with the injured portion of the tire or tire case so placed as to be opposite one of the chambers 4, 5 or 6.

In order to hold the tire or tire case firmly in the vulcanizer during the repairing thereof, I employ a yoke 22 having a central threaded opening 23 to receive a screw 24 provided with an operating handle 25 and a loose head 26 at its lower end. The outer ends of the yoke 22 are provided with recesses 27 arranged to inclose the sleeves 19 and engage under the heads of the bolts 18 when the head 26 on the screw 24 is in engaging relation with the upper face of the member 20.

The operation of this device is as follows: The tire or tire case needing repairs is first equipped or connected with the member 20 and the two placed in the curing cavity in the vulcanizer 1 with the damaged portion so placed as to be opposite one of the steam cavities 4, 5 or 6. The yoke 22 bearing the screw 24 is then positioned with the recesses 27 engaging the sleeves 19 and by manipulating the handle 25, sufficient pressure is produced through the medium of the screw 24, on the outer face of the member 20, to force the tire or tire case 21 into snug engagement with the curing cavity of the vulcanizer which is nearest or opposite the damaged portion of the tire, which effectually vulcanizes the patch or repairing medium required for closing the opening in the tire or tire case. The groove 16 whether open for the admission of air or closed by an insulating material 17 prevents diffusion of heat from the steam chamber, employed in repairing the tire, to the good or uninjured portions of the tire or tire case.

It is obvious that all portions of the tire or tire case beyond the patched or repaired part will be kept cool through the medium of the groove 16 or insulating material 17 while the patched part will be subjected to a vulcanizing heat against the walls of the particular steam chamber opposite to which the patched portion is placed; hence, all portions of the tire will be fully protected from injury or excessive heat, and as the tire is snugly forced into the curing cavity through the medium of the compression screw 24 no shoulders or ridges will be formed at the junction of the patch with the body portion of the tire or tire case. By this apparatus either heavy or light vehicle tires or tire cases or analogous structures may be vulcanized at repair portions very quickly and thoroughly and with the assurance that the patches will be smoothly finished flush with the main body or original outlines of the tire or structure and that the repaired parts will be practically as good as new. Within the scope of this invention the chambers which are not being used for the reception of steam may be utilized as water or atmospheric air circulation chambers, and when thus used a cooling fluid or air may be forced through the unused chambers to aid the result sought by the interposition of the grooves 16 and their contained insulating material for better preventing the spread of heat from one chamber to other portions of the vulcanizer which surround the good or uninjured portions of the tire or tire case.

Having thus described my invention, what I claim and desire to secure by Letters Patent, is:—

1. A vulcanizer comprising a unitary body portion having a curing cavity therein to receive the article to be vulcanized and spaced steam chambers extending longitudinally of and positioned around said curing cavity, said body portion provided with a groove interposed between contiguous steam chambers for limiting the diffusion of heat therefrom, said steam chambers adapted to be independently heated whereby a selected portion of said curing cavity may be exclusively heated.

2. A vulcanizer comprising a unitary body portion having a curing cavity therein to receive the article to be vulcanized and spaced steam chambers extending longitudinally of and positioned around said curing cavity, said body portion provided with a groove interposed between contiguous steam chambers for limiting the diffusion of heat therefrom, an insulating member positioned in said groove and means for conveying a heating medium to any of said steam chambers whereby a selected portion of said curing cavity may be exclusively heated.

3. A vulcanizer comprising a body portion having a curing cavity therein to receive an article to be vulcanized and independent steam chambers positioned around said curing cavity, said body portion being provided with an insulating space interposed between contiguous steam chambers for limiting the diffusion of heat therefrom, an insulating member adapted to be positioned in said space, a member receivable in said curing cavity having one face adapted to engage an article placed therein, a fixed member mounted on said body portion and a detachable member coöperating with said fixed member and provided with means engaging said first-named member for forcing said article into snug engagement with the interior of said curing cavity.

4. A vulcanizer comprising a body portion having a curing cavity therein to receive the article to be vulcanized and spaced steam chambers extending longitudinally of and positioned around said curing cavity, each of said curing cavities being capable of being independently heated, said body portion being formed with an insulating space interposed between contiguous steam chambers for limiting the diffusion of heat therefrom, a member having one face shaped to receive an article in said vulcanizer, a pair of bolts mounted on said body portion, a detachable yoke extending between said bolts, and a threaded element carried by said yoke adapted to engage said member and clamp said article snugly against the interior of said curing cavity, whereby a selected portion of said article may be held against the heated portion of said curing cavity.

5. A vulcanizer comprising a body portion having a curing cavity therein to receive an article to be vulcanized and independent steam chambers positioned around said curing cavity, said body portion being provided with an insulating space interposed between contiguous steam chambers for limiting the diffusion of heat therefrom, a member receivable in said curing cavity having one face shaped to engage an article placed therein, a fixed member mounted on said body portion, a detachable member coöperating with said fixed member and provided with means engaging said first named member for forcing said article into snug engagement with the interior of said curing cavity.

In testimony whereof I have hereunto set my hand in presence of two subscribing witnesses.

JOHN K. WILLIAMS.

Witnesses:
C. E. HUMPHREY,
GLENARA FOX.